May 7, 1940.   R. E. BASSETT, JR   2,199,775
SEQUENTIAL CONTROLLER
Filed Nov. 12, 1938   4 Sheets-Sheet 1
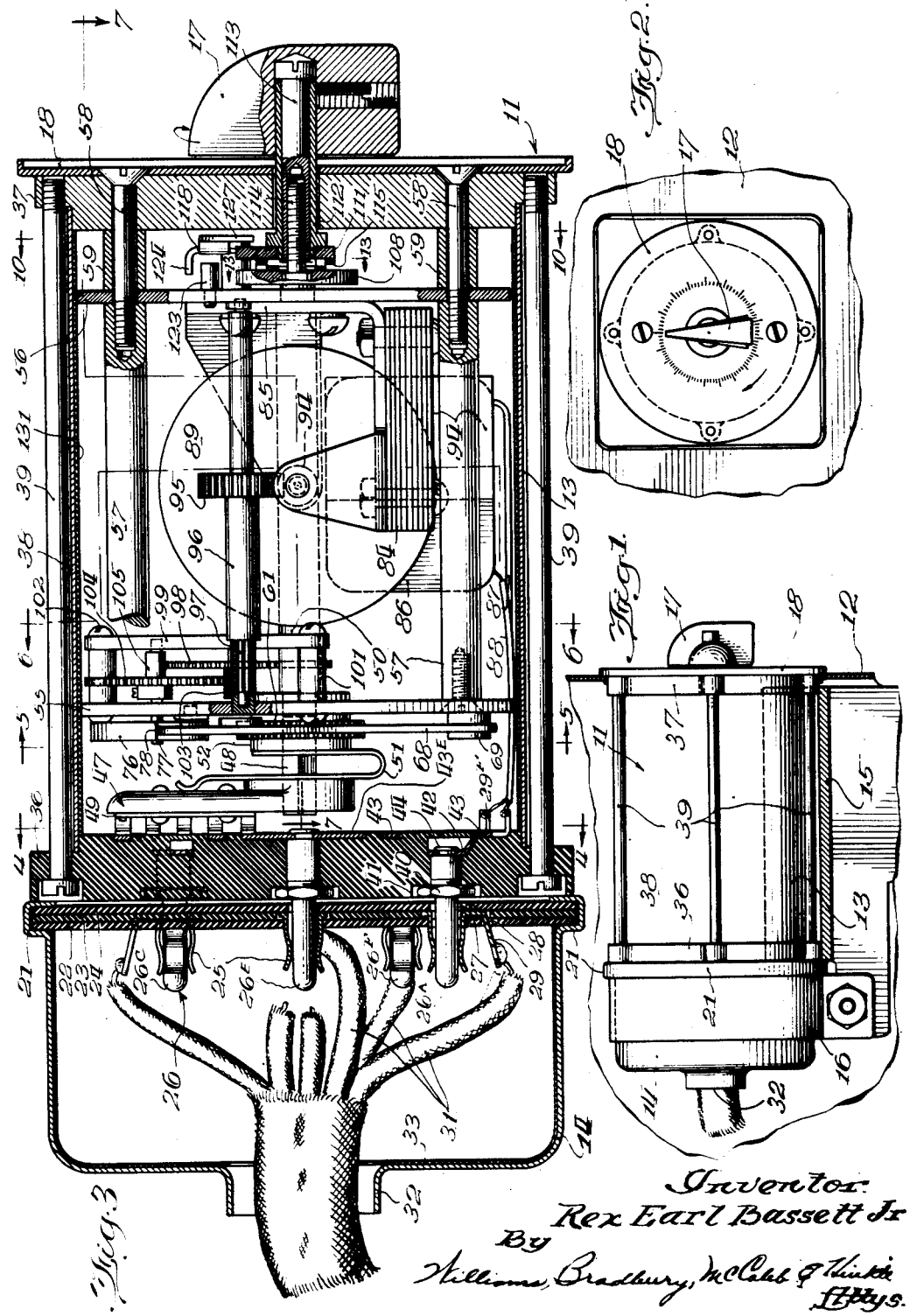
Inventor:
Rex Earl Bassett Jr
By
Williams, Bradbury, McCabe & Hinkle
Attys.

May 7, 1940. R. E. BASSETT, JR 2,199,775
SEQUENTIAL CONTROLLER
Filed Nov. 12, 1938   4 Sheets-Sheet 2
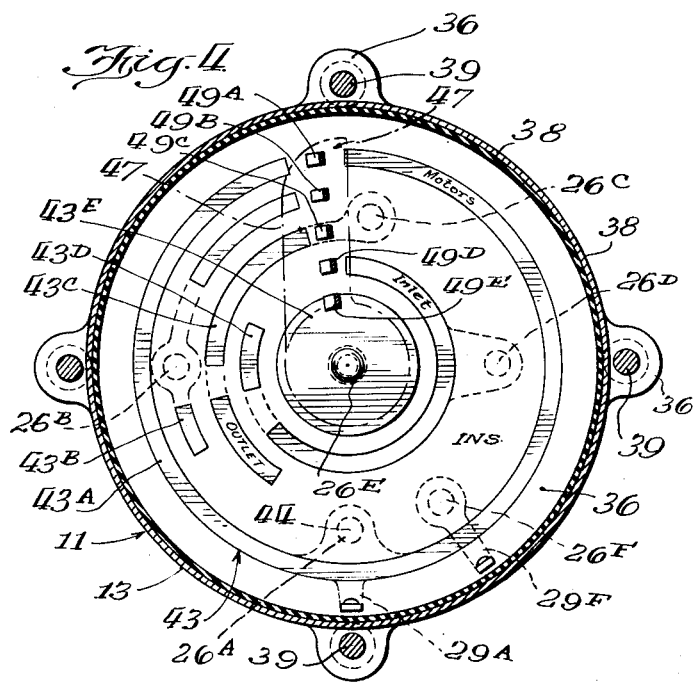
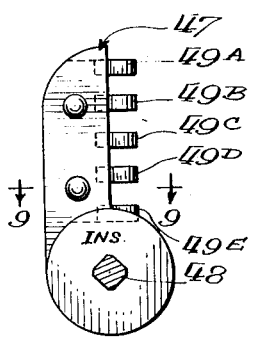
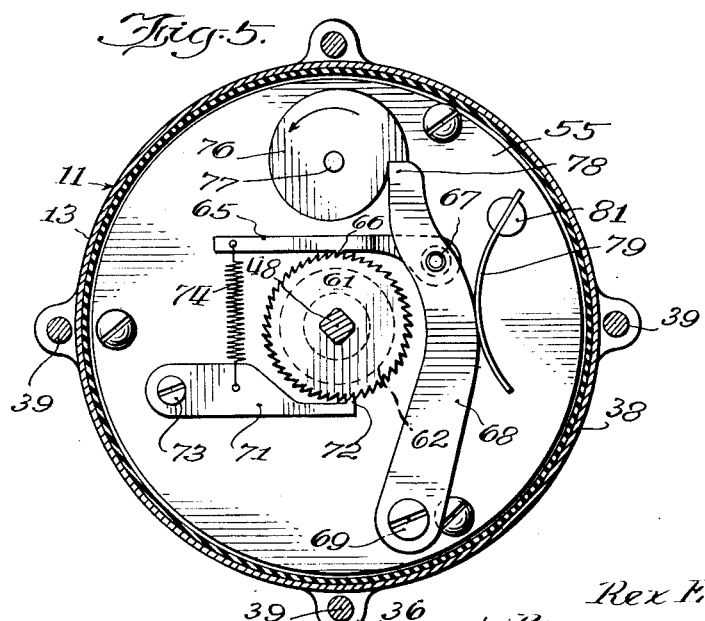
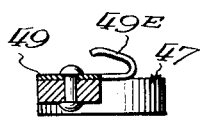
Inventor.
Rex Earl Bassett Jr.

Inventor:
Rex Earl Bassett Jr.
By Williams, Bradbury, McCaleb & Hinkle
Attys.

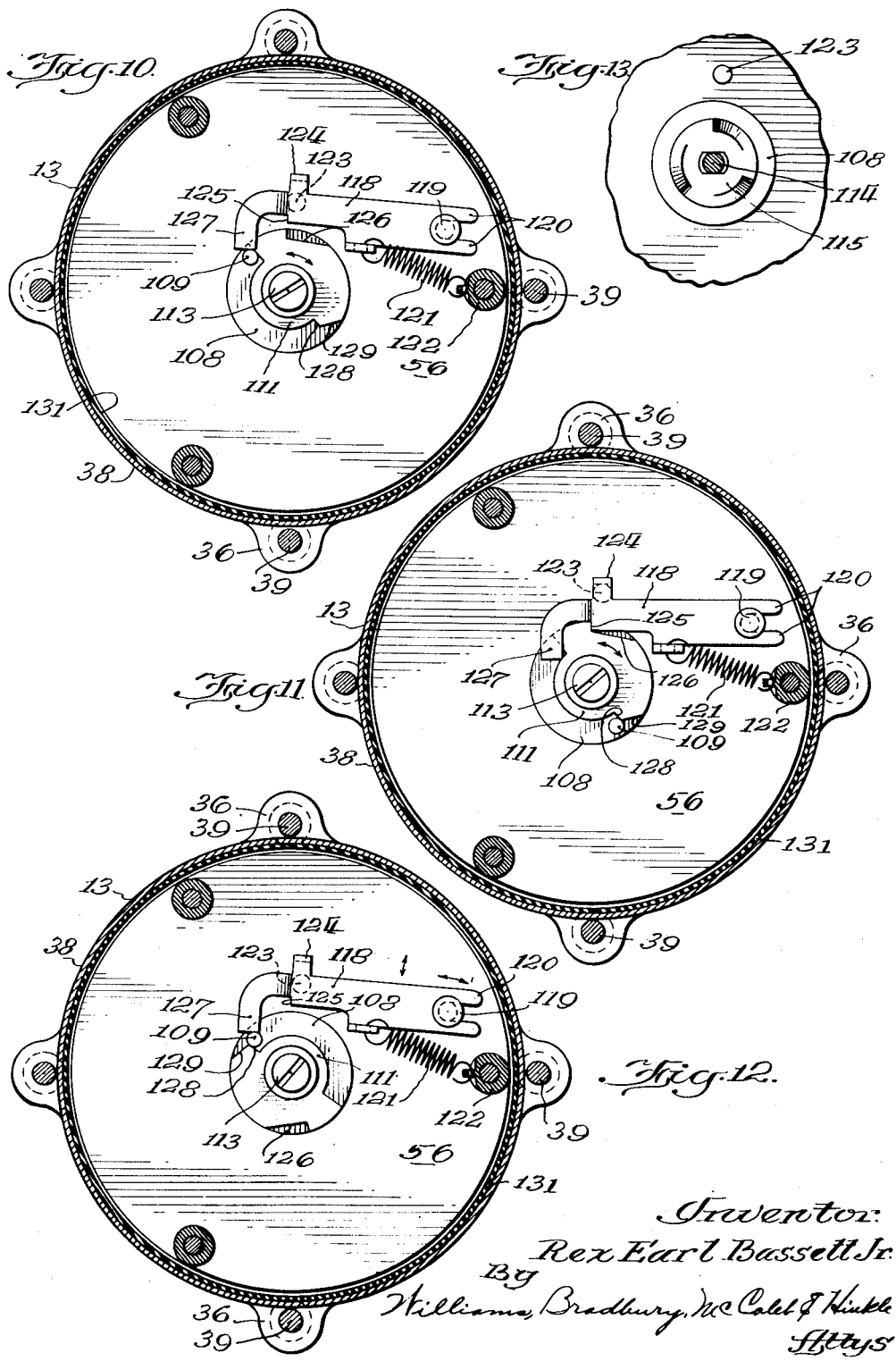

Patented May 7, 1940

2,199,775

UNITED STATES PATENT OFFICE 2,199,775

SEQUENTIAL CONTROLLER

Rex Earl Bassett, Jr., South Bend, Ind., assignor to Bendix Home Appliances, Inc., South Bend, Ind., a corporation of Delaware Application November 12, 1938, Serial No. 240,164

8 Claims. (Cl. 200—92)

This invention relates to sequential controllers and more particularly to electric control mechanism for controlling an automatic washing machine or the like.

One of the objects of the invention is to provide a sequential controller which is compact and easy to manufacture and which can readily be moved from a machine for repair, adjustment or the like.

Another object of the invention is to provide a sequential controller including a motor driving a contact member engageable with a series of segments which are in circuit with devices to be controlled. According to one feature of the invention the motor, contact members and driving mechanism are mounted in a unitary casing which is supported on and electrically connected to the machine to be controlled by a series of prong connectors.

Still another object of the invention is to provide a sequential controller normally operated by power means in which the sequence may be varied manually without affecting the power means. According to an important feature of the invention means are provided to prevent manual operation of the controller into certain positions so that certain of the sequential operations cannot be cut out or shortened.

Other objects, advantages and novel features of the invention will be apparent from the following description when read in connection with the accompanying drawings, in which:

Fig. 1 is a fragmentary vertical section of a cabinet showing one form of a sequential controller, constructed in accordance with the present invention, mounted therein;

Fig. 2 is a fragmentary elevation of the cabinet, showing the front end of the sequential controller;

Fig. 3 is a longitudinal vertical section on a larger scale of the sequential controller;

Fig. 4 is a transverse vertical section taken along the line 4—4 of Fig. 3;

Fig. 5 is a transverse vertical section taken along the line 4—4 of Fig. 3 and showing the details of the means for imparting intermittent rotary movement to the cam shaft of the controller;

Fig. 8 is a front elevation view of the rotating circuit controlling member of the controller shown in Fig. 3;

Fig. 9 is a transverse section taken along the line 9—9 of Fig. 8;

Fig. 10 is a transverse vertical section taken along the line 10—10 of Fig. 3 showing the details of the means provided for preventing manual operation of the circuit controller into predetermined positions;

Fig. 11 is a view similar to Fig. 10, showing the details illustrated therein in a different circuit controlling position;

Fig. 12 is a view similar to Figs. 10 and 11, showing the details illustrated therein in still another circuit controlling position; and Fig. 13 is a fragmentary transverse vertical section taken along the line 13—13 of Fig. 3.

Figure 7:
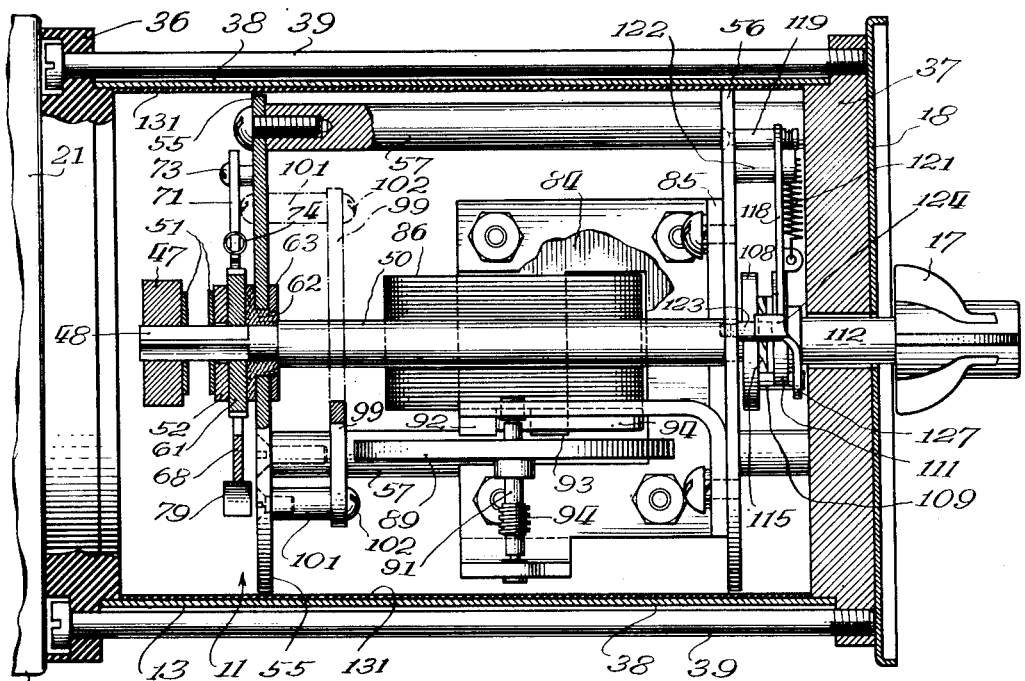
Fig. 7 is a fragmentary horizontal section taken along the line 7—7 of Fig. 3.

In the drawings there is shown a circuit controller particularly adapted to control an automatic washing machine although it will be apparent that the controller might be used in connections with machines of other types.

Referring first to Figs. 1 and 2, the sequential controller indicated generally by reference numeral 11, is shown installed in position on a side wall 12 of a washing machine cabinet. In this position the unitary housing 13 of the controller is located adjacent a fixed receptacle 14 where it is supported not only by the prong connectors (see Fig. 3), but by a horizontally disposed bracket 15, and the side wall 12. The fixed receptacle is secured to the washing machine by a strap 16 surrounding the same and secured in suitable manner to the bracket 15.

The sequential controller is provided with an indicating and adjusting knob 17, cooperatively associated with a dial plate 18, secured in a manner to be hereinafter described to the sequential controller. The dial plate extends outside the wall 12 and is provided with suitable indicia for indicating the various functions that are performed by the washing machine.

The fixed receptacle 14 is formed in the shape of a cup, as may be seen from Fig. 3, and the open front end thereof is provided with a bent-over tongue portion 21 for securing in place three circular socket carrying discs 22, 23 and 24 made of suitable insulating material. The individual sockets 25 comprise resilient fingers adapted to receive the individual prong connectors 26 of the controller adapted to enter the sockets through apertures 27 provided on the outer insulating disc 24. The sockets and connectors are all located at equal distances from the center of their respective supports.

The sockets 25 are positioned in openings provided in the middle disc 23 and are secured in place by the inner disc 22 which is provided with a plurality of apertures 28 through which a bent-over contact terminal 29 is adapted to extend. Each of the contact terminals 29 is connected either to a source of energy, or a circuit that is to be controlled, through a plurality of conductors 31, extending into the receptacle through an opening 32 provided at the rear of the receptacle 14. The inside of the receptacle 14 is lined with an insulating material 33 which covers substantially the entire interior of the metallic shell.

The unitary housing 13 carrying the prong connectors 26 adapted to be inserted into the sockets 25 comprises a pair of substantially circular primary end supports 36 and 37 spaced apart by a cylindrical aluminum shell 38 and secured together by a plurality of screw bolts 39 adapted to be threaded into the front primary support 37. The prong connectors 26 are mounted upon the support 36 by nuts 40 adapted to fit into recesses 41, so that the receptacle and housing may be brought into abutting relationship. The inner ends of the prong connectors extend through openings in inwardly extending portions 42 of arcuate contact segments 43 lying in arcuate recesses formed on the inner side of the support 36. The inner ends of the contact prongs are peened as indicated at 44 in order that when the nuts 40 are tightened the arcuate contacts are fixedly secured in place in the recesses provided on the support 36.

From Fig. 4, it may be noted that there have been provided four arcuate spaced apart contact segments 43A to 43D, inclusive, and a central contact disc 43E. The arcuate segments are each secured in the manner hereinbefore described to corresponding prong contacts 26A to 26D inclusive, and the disc 43E is similarly secured to prong contact 26E.

From Fig. 4 it may be noted that only predetermined portions of the arcuate contact segments are exposed and that other portions are covered by suitable insulating material so that circuits may be closed through the contact segments only at predetermined times.

The connections of the segments to the various devices to be controlled may be accomplished in the manner disclosed in the co-pending application of Aaron A. Loweke, Serial No. 78,692, filed May 9, 1936, which became Patent No. 2,168,068 on August 1, 1939, and is assigned to the assignee of the present invention, which, however, is described briefly hereinbelow.

Cooperating with the contact segments is a movable contact carrying arm 47 made of suitable insulating material and provided with a square opening slidably mounted upon the square end 48 of a cam shaft 50 journaled for rotation and rotated in a predetermined direction by intermittent steps in a manner hereinafter to be fully described.

The arm 47 carries a contact member comprising a longitudinally extending portion 49 (see Fig. 8) and a plurality of resilient contact fingers 49A to 49E, inclusive, adapted to engage the contact segments 43A to 43E, inclusive, as the arm 47 is rotated. The contact carrying arm 47 is biased against the contact segments by a substantially U-shaped resilient spring 51 secured to a washer 52, and through which the square end 48 of the cam shaft extends.

In the control of a washing machine, the movable contact arm is normally in its "off" position, as shown in Fig. 4, where the contact fingers 49A to 49D, inclusive, are shown out of engagement with the contact segments associated therewith. The contact finger 49E is in engagement with the contact disc 43E, and the latter is connected through prong connector 26E to one side of a source of supply (not shown). As the contact is moved in a clockwise direction as viewed in Fig. 4, a circuit is closed first through the contact segment 43A, and the contact segment 43D. The former is connected to the controller driving motor and also the main driving motor, actuating the washing machine. Therefore, both motors will be energized for the time taken by the control motor to drive the contact arm approximately 360 degrees. This results from the fact that the contact segment 43A extends practically 360 degrees.

The closing of a circuit to the contact segment 43D energizes a circuit adapted to energize an inlet valve having in series therewith a float controlled switch. Thus water is admitted to the washing machine until a predetermined level is attained, at which time the inlet valve is deenergized by operation of the float.

During this time the washing machine is in operation, and it will remain in operation with the predetermined amount of water therein until the contact finger 49C engages the contact segment 43C, at which time an outlet valve will be opened, allowing water to drain from the washing machine. After the water drains to a predetermined low level, water is admitted into the washing machine by reason of the fact that the contact 49D is still in engagement with the segment 43D.

During this time, water being both admitted and drained, the materials within the washing machine are rinsed. When the engagement between the contact finger 49D and contact segment 43D is broken, the inlet valve is closed and the supply of water is cut off. A predetermined time later the contact finger 49B engages contact segment 43B and energizes a transmission controlling solenoid whereby the washing machine is operated at a speed sufficient to extract water from the materials contained within the receptacle of the washing machine. Thereafter the textiles within the receptacle are given a second rinsing with fresh water by the second opening of the inlet valve when the contact finger 49D again engages the contact segment 43D.

A short time later the outlet valve is again opened by engagement of the contact finger 49C with the segment 43C, and water will be both admitted and drained from the receptacle, providing an efficient rinsing action. A brief period later the supply of water is terminated in obvious manner, and shortly thereafter the contact finger 49B engages contact segment 43B, to again energize the transmission shifting solenoid.

Finally the receptacle is rotated at high speed with the drain valve open, and after a predetermined length of time, sufficient to extract most of the liquid from the textiles, the contact fingers 49A, B and C are moved out of engagement with the corresponding contact segments 43A, B and C, and the operation of the washing machine is thereby terminated.

It is believed that the above brief description of the circuits controlled by the controller and the resulting washing cycle is adequate in so far as the description of the present invention is concerned. The circuits may be arranged also after the disclosure in the copending application of Rex Earl Bassett, Jr. and John W. Chamberlin, Serial No. 129,429, filed March 6, 1937, which became Patent No. 2,156,884 on July 11, 1939, and which contains a more complete disclosure of the washing cycle.

Intermittent, step-by-step rotation is imparted to the cam shaft 50 through a pawl and ratchet mechanism and a constant speed cam. The pawl and ratchet mechanism is shown particularly in Figs. 5 and 7, from which it may be seen that the ratchet wheel 61 is secured to the square portion 48 of the cam shaft 50 between the washer 42 and a flanged bearing 62 in which the shaft 50 is journaled. The bearing 62 is held in place by a threaded nut 63.

Referring now particularly to Fig. 5, it may be seen that the pawl and ratchet mechanism comprises a pawl 65 provided with a tooth 66 in engagement with the ratchet wheel 61 and pivotally mounted on a pin 67 secured to a pawl actuating arm 68 that is pivotally mounted to the auxiliary support 55 by means of a screw bolt 69 spaced from the axis of rotation of the ratchet wheel a distance greater than the radius of the wheel.

The ratchet wheel 61 is prevented from rotating except in a predetermined direction by means of a dog 71 having a wheel-engaging tooth 72 located opposite to tooth 66. The dog 71 is pivotally mounted upon support 55 by means of a screw bolt 73 substantially diametrically opposite to pin 67. The pawl 65 and dog 71 are connected by a resilient helical spring 74 under tension and adapted to draw the pawl and dog into engagement with the ratchet wheel in such manner that the two will tend to be drawn to a line passing through the pivot points 67 and 73. It may be noted that the pivot points 67, 69 and 73 are all spaced substantially equidistant from each other and from the axis of rotation of the ratchet wheel. Accordingly, the pawl actuating arm corresponds to one side of an equilateral triangle circumscribed about the ratchet wheel.

Movement is imparted to the ratchet wheel in one direction by a cam 76 fixedly secured to a shaft 77 driven at a constant speed by a suitable prime mover hereinafter to be described.

The cam 76 is adapted to engage the end 78 of the pivoted pawl-carrying arm 68, and the latter is maintained in engagement with the cam by means of a curved spring 79 mounted upon a stud 81 secured to the auxiliary support 55. The cam 76 is rotated by a suitable prime mover, and in the present instance this comprises a constant speed electric motor and gearing of the type disclosed in my co-pending application, Serial No. 78,635, filed May 8, 1936.

The motor comprises a laminated field core 84 secured to the front auxiliary support 56 by means of a bracket 85. On one leg of the core is mounted an energizing coil 86 connected by conductors 87 and 88 to the prong contacts 26A and 26F, respectively (see Fig. 3).

The field core 84 is provided with a relatively narrow air gap, within which rotates a disc type armature 89 rotatably mounted upon a drive shaft 91 suitably journaled upon portions of the motor mounting bracket 85, as may be seen from Fig. 7. In order to produce an ordinary shaded pole motor, the portion of the core 84 adjacent the air gap which protrudes from coil 86 is formed into a pair of forks 92 and 93, one of which is surrounded by a copper shading plate 94.

Figure 6:
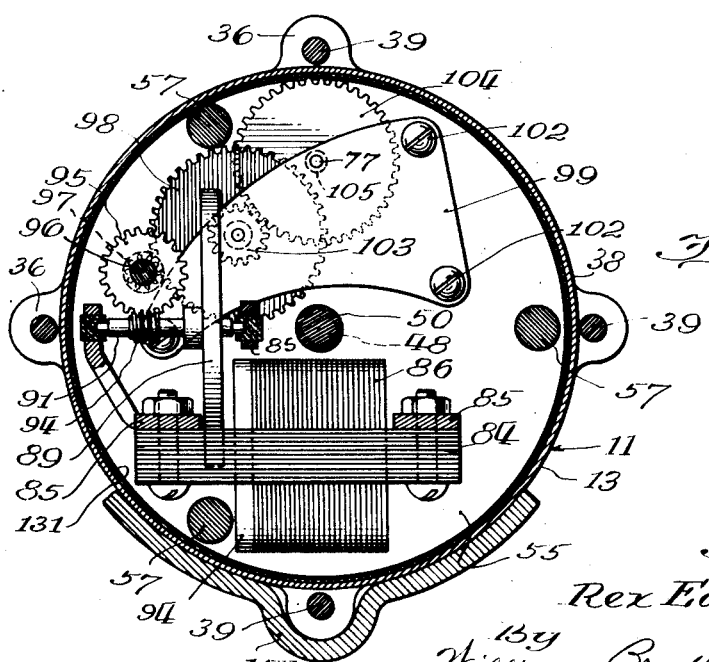
Fig. 6 is a transverse vertical section taken along the line 6—6 of Fig. 3.

Formed on the drive shaft 91 is a worm 94, which drives a Bakelite worm wheel 95 (see Figs. 3 and 6) fixed on a secondary shaft 96 journaled for rotation in the auxiliary supports 55 and 56.

A pinion 97 is cut on the inner end of the secondary shaft 96 for driving a gear 98, which is pressed on a stub shaft having one end journaled in the inner auxiliary support 55, and the other end journaled in an intermediate brass bearing plate 99.

This plate is supported from the inner auxiliary support 55 by means of short posts 101 having threaded sockets in their ends to receive screws 102. Cut on the stub shaft adjacent the gear 98 is a central pinion 103 (see Fig. 6) which drives a secondary gear 104 fixed on a hub 105 adapted to be secured to the shaft 77 on which the cam 76 is mounted. From Fig. 3 it may be seen that the shaft 77 is journaled for rotation in the rear auxiliary support 55 and the intermediate support 99.

Intermediate the front primary and auxiliary supports 57 and 56 there is provided a mechanism whereby the cam shaft 50 may be rotated into predetermined positions by the indicating knob 17. The mechanism is also adapted, as will appear shortly, to prevent the indicating knob from actuating the cam shaft into certain circuit controlling positions. The reasons for this arrangement is that in washing machines of the type disclosed in my co-pending application, Ser. No. 6,425 filed February 14, 1935, in which the textiles are distributed within a rotating receptacle at particular speeds, it is necessary to prevent the operation of the washing machine into its centrifuging position without going through the distributing operation.

In the present instance the mechanism comprises a circular disc 108 pressed onto a reduced portion of the cam shaft 50 intermediate the front main and auxiliary supports, and adjacent the latter. Disc 108 carries a pin 109 extending forward therefrom and adapted to engage a cam 111, adapted to be rotated by the indicating knob 17. The cam 111 and knob are both fixedly mounted upon a sleeve 112, which is rotatable with respect to a retaining bolt 113 in threaded engagement with a reduced forward extension 114 formed integral with the cam shaft 50.

The disc 108 and cam 111 are maintained in spaced-apart relationship by a resilient washer 115 interposed therebetween. Associated with the disc and cam is a locking lever 118 having both pivotal and lateral motion with respect to a pivot stud 119 secured to the front auxiliary support 56. The lateral movement is provided by construction of the lever with a pair of forked extensions 120 and biasing the lever toward the pivot point by means of a helical spring 121 attached to the lever and to a stud 122 secured to the auxiliary support 56.

Counterclockwise movement of the lever 118, as viewed in Figs. 10 to 12, inclusive, is limited by a pin 123 mounted on the auxiliary support 56, and adapted to engage a rearwardly extending projecting finger 124 formed integrally with the lever 118.

The lever is adapted to prevent turning of the cam 111 by the knob 17 whenever a right angle portion 125 of the lever falls into a cut-away portion 126 of the cam 111, as indicated in Fig. 11, into which position the lever arm is drawn by the spring 121. Whenever the cam 111 is turned into the position indicated in Fig. 11, further actuation of the cam shaft 50 thereby is prevented. Consequently the cam shaft must be thereafter driven by means of the control motor until the pin 109, which extends forward beyond the front side of the cam 111, as may be noted from Fig. 7, engages a forwardly and downwardly extending projection 127 formed integral with the lever 118.

Whenever the pin is rotated by the motor from the position indicated in Fig. 11 to the position where the pin 109 engages the bottom of the projection 127, the lever arm is lifted from its locking position to the position indicated in Fig. 10, after which the cam shaft may again be rotated by rotating the cam 111. This operation is indicated in Fig. 12, which shows the cam 111 in position to start turning of the cam shaft.

At this time a radially extending portion 128 of cam 111 is in engagement with the pin 109, and further rotation of cam 111 results in rotation of the disc 108 and cam shaft. After the pin 109 has been rotated from under the projection 127, the latter engages an inclined portion 129 of the cam 111, which prevents the projection 127 from obstructing rotation of the cam.

The inside of the aluminum shell 38 may be lined with a thin sheet of insulating material 131 similar to the lining of the fixed receptacle 14.

In operation the controller will be operated normally to its "off" position in which the contact fingers 49A to 49D, inclusive, are out of engagement with their associated contact segments, as illustrated in Fig. 4. When it is desired to place the apparatus into operation, the indicator knob 17 is rotated to the right until the radial portion 128 of cam 111 comes into contact with the pin 109 carried by disc 108 attached to the cam shaft 50. The indicating knob is then rotated further, thus rotating the cam shaft into a position wherein the contact finger 49A engages contact segment 43A and the contact finger 49D engages contact segment 43D.

As described above, the engagement of contact finger 49A with contact segment 43A results in the supply of energy to the control motor 84 through conductors 86 and 87 which are connected to the prong connectors 26A and 26F, respectively. The circuit to the motor extends from connector 26E to the contact disc 43E, thence through the movable contact 49 to contact 49A, the terminal 29A, conductor 87 to the motor and thence to the other supply conductor through conductor 88, terminal 29F, connector prong 26F and the conductor attached thereto.

The remaining circuits are closed in similar fashion whenever the corresponding connector fingers and contact segments engage and the washing machine is controlled in the manner previously described to perform the various operations desired.

Whenever it is desired to have the machine perform its various functions in accordance with the normal control, the motor 84 drives the cam shaft 50 through the pawl and ratchet mechanism. The cam 76 is rotated at a constant speed through the various gears supported upon the rear auxiliary support 55 and the intermediate support 99.

The rotation of the cam, which is constructed with a constant rise, imparts an oscillating motion to the pivotally mounted arm 68. The arm 68 follows the cam by reason of the fact that it is biased in the direction of the cam by the spring 79. The rotation of the cam moves the arm 68 to the right, as viewed in Fig. 5, and thus the arm moves the pawl 65 in the same direction, the cam being so constructed that the tooth 66 of the pawl is moved the distance of a single ratchet tooth to the right before it drops off the high point of the cam. Upon dropping from the high point, the arm 68 is moved very rapidly by the resilient spring 79 and thereby imparts rotary movement to the cam shaft 50.

The forward movement of the cam shaft is thus of a predetermined length and the contact segments are so constructed that the contact fingers move out of engagement therewith during the course of a single step. Thus, a quick break of the contacts is assured.

In case it is desired to hasten the performance of a particular function by the washing machine, the indicator knob 17 is rotated to the right. Thus, the washing period may be shortened considerably by rotating the cam shaft by means of the cam 111 which is adapted to engage the pin 109. The washing operation may be hastened until the pin 109 is moved to the point wherein it is illustrated in Fig. 11, at which time further movement of the cam 111 is prevented by the shoulder 125 on the locking lever 118. After the locking of cam 111, the cam shaft must be rotated by the electric motor through the gearing and cam, as described above, until the pin 109 reaches a position as illustrated in Fig. 10, wherein it lifts the locking lever 118. When the locking lever is lifted to approximately the height illustrated in Fig. 10, the cam shaft may be again rotated manually by moving the cam 111 to the position indicated in Fig. 12.

The cam shaft is prevented from rotating in a direction opposite to that described above by the dog 71 and thus the possibility of the apparatus being forced to perform the desired functions in reversed order is eliminated.

It may be seen, therefore, that the sequential controller described is so constructed and arranged that the controller may be manually operated into certain positions, but must be operated through certain other positions by the time controlled means. Thus, it may be seen that the above described controller is particularly adapted for use with apparatus of the type wherein it is necessary to insure the performance of certain operations at a predetermined rate.

While one form of controller has been described in detail in connection with an automatic washing machine it will be apparent that many other machines might be controlled and that changes might be made in the controller itself. It is therefore not intended to limit the scope of the invention by the above description nor otherwise than by the terms of the appended claims.

All of the subject-matter described above is fully disclosed in my application Serial No. 141,078, filed May 6, 1937.

What is claimed is:

1. In a time controlled circuit controller, the combination including a pair of secondary supports, a shaft extending through both supports, a prime mover mounted between said supports, a cam mounted outside the inner of said supports and rotated by said prime mover, a ratchet wheel mounted on said shaft outside said inner support, a pivotally mounted pawl for imparting intermittent one way movement to said shaft, an arm pivotally mounted on said inner support mounting said pawl and adapted to be actuated by said cam, circuit controlling means mounted on said shaft for rotation therewith, a pair of primary supports through the outer one of which said shaft extends and to which said auxiliary supports are secured, circuit controlling means on the outer side of said inner primary support in cooperative relation to said rotatable circuit controlling means, and means including prong connectors extending through said inner primary support for securing said second mentioned circuit controlling means to said support.

2. In a circuit controller, the combination including rotatable circuit controlling means, motor means for rotating said controlling means, manually operable means for rotating said controlling means ahead of the position to which it is moved by the motor means, and means preventing operation of said last mentioned means to rotate said controlling means to a predetermined position said motor means being constructed and arranged to move the controlling means to said predetermined position.

3. In a circuit controller, the combination including rotatable circuit controlling means, first means for rotating said controlling means, second means for rotating said controlling means ahead of the position to which it is moved by said first means, and means preventing operation of said last mentioned means to rotate said circuit controlling means through predetermined angular positions said first means being capable of moving the controlling means to said predetermined position.

4. In a circuit controller, the combination including a plurality of circuit controlling members, a rotatable shaft and cam carried thereby for operating said members, a motor for rotating said shaft in a predetermined direction, a pin mounted for rotation with said shaft, manually operable cam means adapted to engage said pin to rotate said shaft manually, and means associated with said last mentioned cam means for preventing rotation of said shaft thereby through predetermined angular positions.

5. A sequential controller comprising a plate, a plurality of arcuate radially spaced contact segments on said plate, a shaft, a rotatable wiper arm mounted on said shaft and having a plurality of contact members engageable respectively with said segments, driving means controlled by said wiper arm, intermittent drive mechanism connecting said driving means with said wiper arm said mechanism including a one-way driving device, and manual means for turning said shaft and wiper arm so that said one-way device overruns and the driving means is not affected.

6. A sequential controller comprising switch means arranged to be operated in a predetermined sequence, a rotatable shaft for operating said switch means, power operated mechanism including a one-way driving device for driving said shaft, and manual means for turning said shaft independently of said mechanism so that said one-way driving device overruns, whereby the sequence of operations may be varied.

7. A sequential controller comprising switch means arranged to be operated in a predetermined sequence, a rotatable shaft for operating said switch means, power operated mechanism for driving said shaft, manual means for turning said shaft independently of said mechanism, and locking means for preventing manual turning of the shaft into certain positions, said locking means being released by operation of the power operated mechanism.

8. A sequential controller comprising switch means arranged to be operated in a predetermined sequence, a rotatable shaft for operating said switch means, power operated mechanism for driving said shaft, manual means for turning said shaft independently of said mechanism, a locking cam secured to said manual means, a locking lever engageable with the cam to prevent manual turning of the shaft into certain positions, and means operated by the power mechanism to move the lever out of locking engagement with the cam.

REX EARL BASSETT, Jr.

CERTIFICATE OF CORRECTION.

Patent No. 2,199,775.                                        May 7, 1940.

REX EARL BASSETT, JR.

It is hereby certified that error appears in the printed specification of the above numbered patent requiring correction as follows: Page 3, first column, line 1, for the patent number "2,156,884" read --2,165,884--; and that the said Letters Patent should be read with this correction therein that the same may conform to the record of the case in the Patent Office.

Signed and sealed this 1st day of October, A. D. 1940.

(Seal)                                    Henry Van Arsdale,
                                              Acting Commissioner of Patents.